(12) United States Patent
Cyzen

(10) Patent No.: US 11,577,114 B2
(45) Date of Patent: *Feb. 14, 2023

(54) TRAVEL EXERCISE EQUIPMENT ASSEMBLIES

(71) Applicant: Keith Cyzen, Glen Ellyn, IL (US)

(72) Inventor: Keith Cyzen, Glen Ellyn, IL (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/157,236

(22) Filed: Jan. 25, 2021

(65) Prior Publication Data

US 2021/0138290 A1    May 13, 2021

Related U.S. Application Data

(63) Continuation of application No. 16/785,213, filed on Feb. 7, 2020, now Pat. No. 10,912,967.

(60) Provisional application No. 62/803,762, filed on Feb. 11, 2019.

(51) Int. Cl.
| | |
|---|---|
| *A63B 21/072* | (2006.01) |
| *A63B 21/00* | (2006.01) |
| *A63B 21/06* | (2006.01) |
| *A63B 21/075* | (2006.01) |

(52) U.S. Cl.
CPC ...... *A63B 21/0724* (2013.01); *A63B 21/0605* (2013.01); *A63B 21/075* (2013.01); *A63B 21/0722* (2015.10); *A63B 21/4033* (2015.10); *A63B 2210/50* (2013.01)

(58) Field of Classification Search
CPC ............. A63B 21/0724; A63B 21/075; A63B 21/4033; A63B 21/0605; A63B 21/0722; A63B 2210/50; A63B 21/0602; A63B 21/0603; A63B 21/0728; A63B 21/4035; A63B 2225/09; A01B 1/022

See application file for complete search history.

(56) References Cited

U.S. PATENT DOCUMENTS

| | | | | | |
|---|---|---|---|---|---|
| 793,101 | A | * | 6/1905 | Schmidt | A61H 7/007 482/108 |
| 3,007,699 | A | * | 11/1961 | Taylor | A63B 21/4035 482/97 |
| 3,592,475 | A | * | 7/1971 | Terry | A63B 69/0079 473/147 |
| 3,724,846 | A | * | 4/1973 | Perrine | A63B 71/12 482/106 |
| 4,029,312 | A | * | 6/1977 | Wright | A63B 21/0602 482/108 |
| 4,082,203 | A | * | 4/1978 | Schjeldahl | B65G 59/106 221/211 |
| 4,103,887 | A | * | 8/1978 | Shoofler | A63B 21/0602 482/106 |
| 4,199,140 | A | * | 4/1980 | Ferretti | A63B 21/0602 222/210 |

(Continued)

*Primary Examiner* — Garrett K Atkinson
(74) *Attorney, Agent, or Firm* — Hunton Andrews Kurth LLP

(57) ABSTRACT

Example travel exercise equipment includes a barbell including a first end portion and a second end portion and a pair of yokes. Each yoke includes a base and a pair spaced-apart yoke arms extending from the base. The bases being adapted to be coupled to a corresponding end portion of the barbell. The travel exercise equipment includes a pair of containers having handles adapted to be carried by a corresponding yoke.

12 Claims, 4 Drawing Sheets

(56) References Cited

U.S. PATENT DOCUMENTS

| | | | | |
|---|---|---|---|---|
| 4,213,605 A * | 7/1980 | McPeak | A63B 21/072 | 224/201 |
| 4,722,329 A * | 2/1988 | Kalvag | A61H 1/0229 | 602/32 |
| 5,421,797 A * | 6/1995 | Fletcher | A63B 21/072 | 482/106 |
| 5,472,398 A * | 12/1995 | Silverman | A63B 21/4005 | 482/105 |
| 5,480,204 A * | 1/1996 | Erickson | B65D 67/02 | 206/151 |
| 5,839,994 A * | 11/1998 | Elbogen | A63B 3/00 | 482/91 |
| 5,871,422 A * | 2/1999 | Elbogen | A63B 3/00 | 482/40 |
| 5,885,190 A * | 3/1999 | Reiter | A63B 7/00 | 482/129 |
| 7,163,488 B2 * | 1/2007 | Anders | A63B 21/0724 | 482/104 |
| 7,201,711 B2 * | 4/2007 | Towley, III | A63B 21/0605 | 482/106 |
| 7,591,772 B2 * | 9/2009 | Shillington | A63B 21/0728 | 482/106 |
| 7,681,766 B2 * | 3/2010 | Harrison, III | A45F 3/10 | 224/265 |
| 8,337,372 B1 | 12/2012 | Boterenbrood | | |
| 8,870,717 B2 | 10/2014 | Pfitzer | | |
| 9,079,070 B2 | 7/2015 | Reynolds et al. | | |
| 9,138,610 B2 * | 9/2015 | Lovegrove | A63B 21/0724 | |
| 9,320,938 B1 | 4/2016 | Belmore | | |
| 9,539,851 B1 * | 1/2017 | Tanda | A45F 5/102 | |
| 9,636,538 B2 * | 5/2017 | DiPasquale | A63B 21/0728 | |
| 9,914,002 B2 | 3/2018 | Stroup | | |
| 2002/0098953 A1 * | 7/2002 | Scheewe | A63B 21/0626 | 482/94 |
| 2005/0233871 A1 * | 10/2005 | Anders | A63B 21/0724 | 482/93 |
| 2008/0200316 A1 * | 8/2008 | Shillington | A63B 21/0728 | 482/106 |
| 2010/0323852 A1 * | 12/2010 | Locsin | A63B 21/4017 | 482/96 |
| 2018/0133538 A1 * | 5/2018 | Jones | A63B 21/0602 | |
| 2018/0333603 A1 | 11/2018 | Peyton | | |

* cited by examiner

TRAVEL EXERCISE EQUIPMENT ASSEMBLIES

FIELD OF THE DISCLOSURE

The present patent relates generally to exercise equipment and, in particular, to travel exercise equipment assemblies for beach vacations.

BACKGROUND

Travel may impact the ability of an individual to maintain a workout regime. Some issues adding to the difficulty of maintaining the workout regime include space constraints and weight constraints when traveling. Due at least in part to the space constraints and/or the weight constraints, individuals may not pack their exercise equipment when traveling.

SUMMARY

Figure 1:
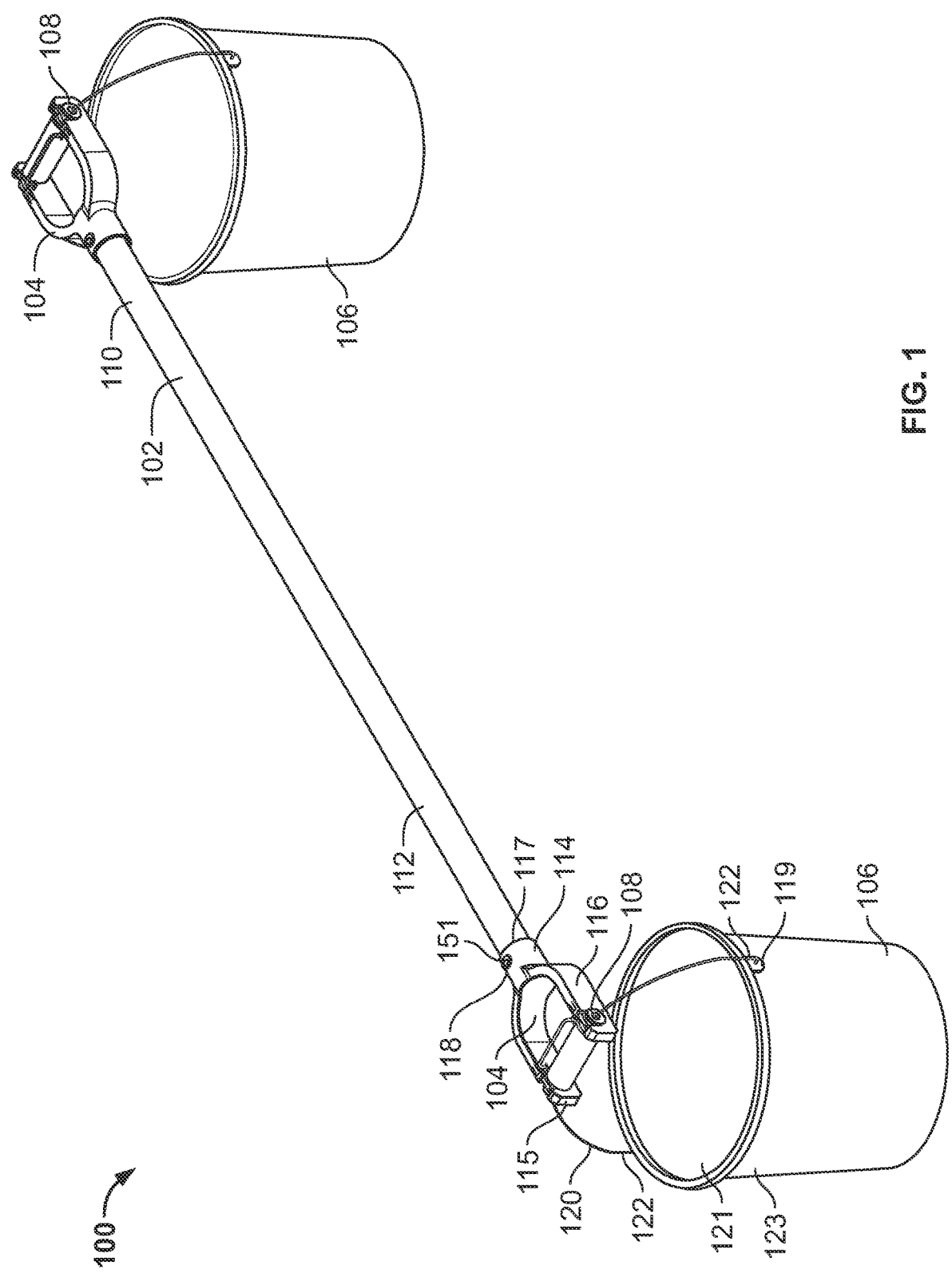
FIG. 1 is an isometric view of travel exercise equipment in accordance with a first disclosed example.

In accordance with a first example, travel exercise equipment for use with containers having handles includes a barbell including a first end portion and a second end portion. The travel exercise equipment also includes a pair of yokes. Each yoke includes a base and a pair of spaced-apart yoke arms extending from the base. The bases are adapted to be coupled to a corresponding end portion of the barbell.

In accordance with a second example, travel exercise equipment includes a barbell including a first end portion and a second end portion and a pair of yokes. Each yoke includes a base and a pair of spaced-apart yoke arms extending from the base. The bases being adapted to be coupled to a corresponding end portion of the barbell. The travel exercise equipment includes a pair of containers having handles adapted to be carried by a corresponding yoke.

In accordance with a third example, a method of forming exercise equipment includes filling a pair of containers with material. Each container has a handle. The method includes coupling a first yoke including a pair of spaced-apart yoke arms to a first end portion of a barbell. The method includes coupling a second yoke including a pair of spaced-apart yoke arms to a second end portion of the barbell. The method includes coupling each handle to a corresponding yoke.

In further accordance with the foregoing first, second and/or third examples, an apparatus and/or method may further include any one or more of the following:

In accordance with one example, each arm includes an arm groove adapted to receive a portion of a corresponding handle.

In accordance with another example, the arm grooves are upward facing arm grooves.

In accordance with another example, each arm has a track. Further including a cover movable within the tracks between a covering position that covers the arm grooves and an uncovering position that uncovers the arm grooves.

In accordance with another example, each track includes a front opening and a side opening and the cover includes first cover portions, second cover portions, and a cover handle. The first cover portions being movable through the corresponding front opening between the uncovering position and the covering position. Each second cover portion extending through and being movable within a corresponding side opening. The cover handle being coupled to the second cover portions and adapted to move the cover between the covering position and the uncovering position.

In accordance with another example, each arm has a lock extending into the corresponding track and adapted to retain the cover in either of the covering position and the uncovering position.

In accordance with another example, the lock includes a flexible tab.

In accordance with another example, the spaced-apart yoke arms form a U-shape.

In accordance with another example, the base includes a receptacle and a transverse fastener bore. The receptacle is adapted to receive the corresponding end portion of the barbell and the transverse fastener bore is adapted to receive a fastener that couples the base and the corresponding end portion.

In accordance with another example, each of the yoke arms defines a slot having an opening and a groove arranged to receive the handle of the container.

In accordance with another example, each arm includes a first arm portion and a second arm portion and the groove includes a first arm groove portion and a second arm groove portion. The slots are defined between the corresponding arm portions. The first arm groove portion is formed by the first arm portion and the second arm groove portion is formed by the second arm portion.

In accordance with another example, further including a band surrounding each arm and arranged to slide along the corresponding arm to change a width of the slot.

In accordance with another example, each band defines a forward facing cut-out that is adapted to receive a portion of the handle.

In accordance with another example, each arm includes a forward stop and a rearward stop between which the corresponding band is positioned.

In accordance with another example, the barbell includes a first barbell portion and a second barbell portion couplable to the first barbell portion.

In accordance with another example, the first barbell portion and the second barbell portion are couplable via a threaded connection.

In accordance with another example, each handle includes a central portion, end flanges, and circumferential-handle grooves formed about the handle and between the central portion and the corresponding end flanges. The circumferential-handle grooves are adapted to be received within the arm grooves.

In accordance with another example, further including a shovel head adapted to be coupled to the first end portion or the second end portion.

In accordance with another example, further including moving a cover over a portion of each handle received by the corresponding yoke.

In accordance with another example, coupling each handle to the corresponding yoke includes positioning each handle in a pair of arm grooves.

In accordance with another example, each of the yoke arms defines a slot having an opening arranged to receive the handle. Further including reducing a width of the slot to secure the corresponding handle within the slot.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

The examples disclosed herein relate to travel exercise equipment that may be used to perform different exercises. The travel exercise equipment includes a barbell and fillable kettle bells. The kettle bells may be adapted to be used without the barbell or may be attached to end portions of the barbell.

Some exercises that may be performed using the disclosed travel exercise equipment include barbell exercises and kettle bell exercises. Some barbell exercises may include squats, deadlifts, lunges, calf raises, bench press, pull overs, rows, military presses, shrugs, and bicep curls. Some kettle bell exercises may include push presses, squats, military presses, and a one-leg dead lifts. Other exercises may be performed using the disclosed exercise equipment.

FIG. 1 is an isometric view of travel exercise equipment 100 in accordance with a first disclosed example. In the example shown, the exercise equipment 100 includes a barbell 102, a pair of yokes 104, and a pair of containers 106. The containers 106 have handles 108. The containers 106 may be referred to as kettle bells or fillable-kettle bells.

The barbell 102 includes a first end portion 110 and a second end portion 112. Each of the yokes 104 includes a yoke base 114 and a pair of spaced-apart yoke arms 115, 116. The yoke arms 115, 116 extend from the yoke base 114. The yokes 104 may be formed of relatively rigid material. The yokes 104 may be made of plastic. However, the yokes 104 may be formed of another material (e.g., metal).

The yoke bases 114 are adapted to be coupled to a corresponding end portion 110, 112 of the barbell 102. The yokes 104 may be decoupled from the barbell 102 for storage and/or travel. The handles 108 are adapted to be carried by a corresponding yoke 104.

In the example shown, the yoke base 114 includes a receptacle 117 and a transverse fastener bore 118. The receptacle 117 is adapted to receive the corresponding end portion 110, 112 and the transverse fastener bore 118 is adapted to receive a fastener 151 that couples the yoke base 114 to the corresponding end portion 110, 112. The fastener 151 may be a screw, a pin that receives a clip, a pin that threads into the barbell 102, or a spring biased plunger. Other types of fasteners or arrangements may prove suitable.

The container 106 also includes container mounts 119, a wire bail 120, and a lid 121. The wire bail 120 extends through a bore of the handle 108. Bail end portions 122 are received in the container mounts 119 to couple the bail 120 and the container 106. The bail end portions 122 may be removed from the container mounts 119 to more-easily allow the containers 106 to be stacked for storage and/or travel.

The lid 121 may be coupled to a peripheral edge 123 of the container 106 via a snap fit connection. Other approaches of coupling the lid 121 and the peripheral edge 123 may prove suitable. For example, a threaded connection or an interference fit may be provided between the lid 121 and the peripheral edge 123.

The barbell 102 is shown in the illustrated example as a single bar. However, in other examples, the barbell 102 may include two or more segments that are coupled together via threads (see, for example, FIG. 4). In the example shown, the yoke arms 115, 116 form a U-shape. However, the yoke arms 115, 116 may form another shape. For example, the yoke arms 115, 116 may include corners formed by approximately 90° angles (see, for example, FIG. 3). As an alternative, the yoke 104 may not include the pair of yoke arms 115, 116 and may instead include a single arm. In such an example, the single arm may be wider to secure the handle 108 relative to the barbell 102 and to prevent the handle 108 from twisting when performing exercises.

Figure 2:
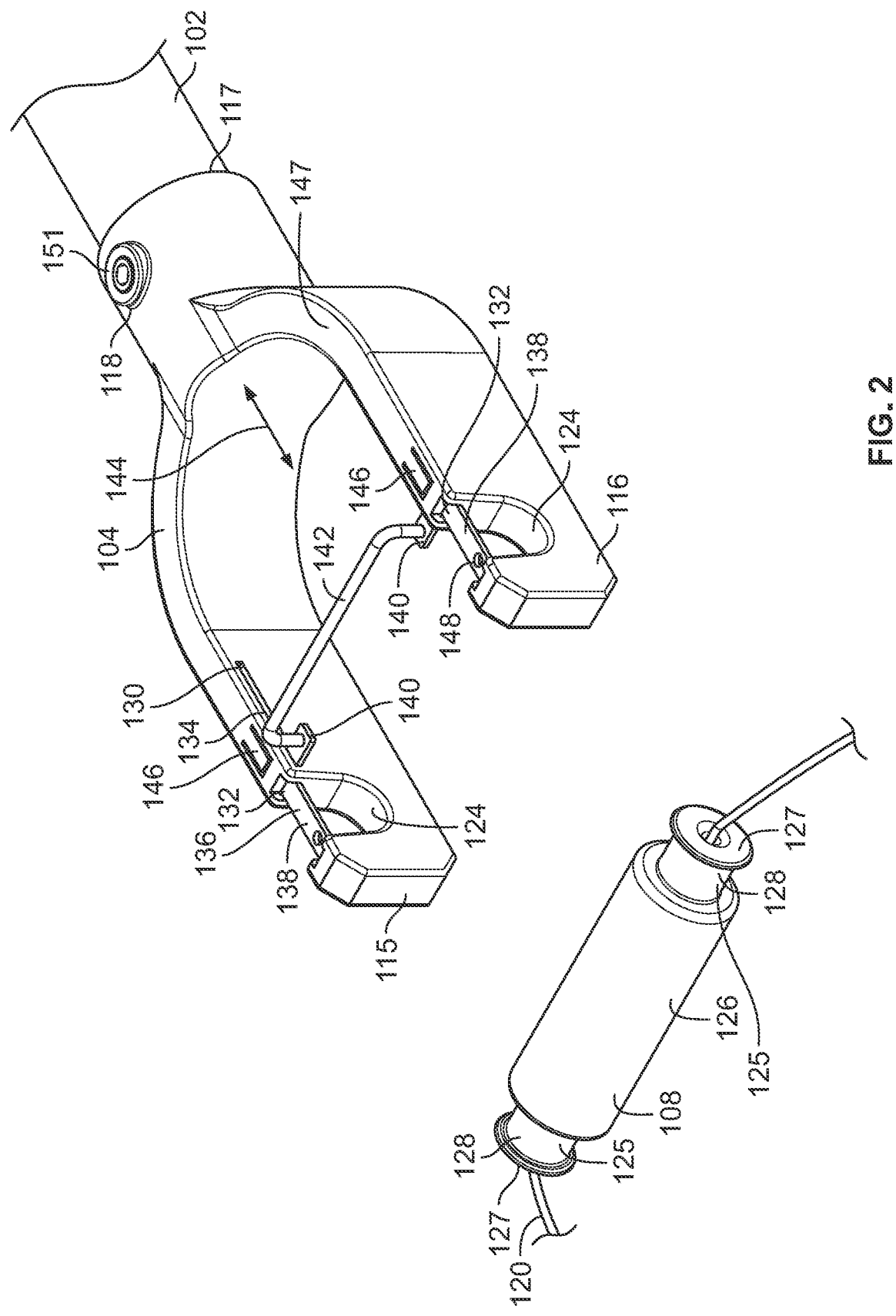
FIG. 2 is a detailed expanded isometric view of a handle, a yoke, and a portion of a barbell of the travel exercise equipment of FIG. 1.

FIG. 2 is a detailed expanded isometric view of the handle 108, one of the yokes 104, and a portion of the barbell 102. In the example shown, each yoke arm 115, 116 includes an arm groove 124. The arm grooves 124 are adapted to receive a portion 125 of the handle 108. The arm grooves 124 may be referred to as upward facing arm grooves. The arm grooves 124 may be U-shaped and may include chamfered sides.

The handle 108 of the container 106 includes a central portion 126, end flanges 127, and circumferential-handle grooves 128. The handle grooves 128 are formed about the handle 108 and between the central portion 126 and the end flanges 127. Specifically, the handle grooves 128 are defined by the portion 125 of the handle 108, the central portion 126 of the handle 108, and the end flanges 127 of the handle 108. The handle grooves 128 are adapted to be received within the arm grooves 124 to secure the container 106 and the barbell 102/yoke 104. As an alternative, the handle grooves 128 may be adapted to receive the bail 120 of the container 106 to secure the container 106 and the barbell 102/yoke 104.

The central portion 126 of the handle 108 and the end flanges 127 of the handle 108 are adapted to interact with the yoke arms 115, 116 at the arm groove 124 to retain the position of the handle 108 within the yoke 104. The interaction between the handle 108 and the yoke 104 may restrict side-to-side movement of the handle 108 relative to the yoke 104.

In the example shown, each yoke arm 115, 116 has a track 130 including a front opening 132 and a side opening 134. A cover 136 is movable within the tracks 130 between a covering position that covers the arm grooves 124 (shown in FIG. 2) and an uncovering position that uncovers the arm grooves 124. The cover 136 includes first cover portions 138, second cover portions 140, and a cover handle 142. The cover handle 142 may be formed of a bent metal rod. Other types of handles and/or materials may prove suitable. For example, the cover handle 142 may be an injection molded handle or a sheet metal plate.

The cover handle 142 is coupled to the second cover portions 140. The cover handle 142 may be coupled to the second cover portions 140 by swaging (mechanical deformation), welding, heat staking, a flanged external retaining ring, a c-clip or e-clip retaining ring, or a push-on retaining cap. Other fasteners may prove suitable. In some such examples, distal ends of the cover handle 142 are positioned through apertures of the second cover portions 140 to allow for the distal ends of the cover handle 142 to receive the fastener (e.g., a push ring).

In the example shown, the cover handle 142 is adapted to move the cover 136 between the covering position and the uncovering position. Specifically, in the example shown, the first cover portions 138 are movable through the corresponding front openings 132 between the uncovering position and the covering position and each of the second cover portions 140 extends through and is movable within a corresponding side opening 134. Moving the cover handle 142 in a direction generally indicated by arrow 144 moves the cover 136 between the covering position and the uncovering position.

Each yoke arm 115, 116 includes a lock 146. The lock 146 extends into the corresponding track 130 and is adapted to retain the cover 136 in either of the covering position and the uncovering position. The lock 146 may be formed of a flexible tab/detent that is molded into an upper face 147 of the yoke 104. In the example shown, the lock 146 is normally positioned in the locked position but is movable to the unlocked position to allow the cover 136 to move between the covered position and the uncovered position. The lock 146 may include a catch that is receivable within notches/indentations 148 of the first cover portion 138. The catch may be formed by a bump. Each first cover portion 138 may include a pair of spaced-apart notches 148, with one of the notches 148 receiving the catch in the covered position and the other of the notches receiving the catch in the uncovered position.

Figure 3:
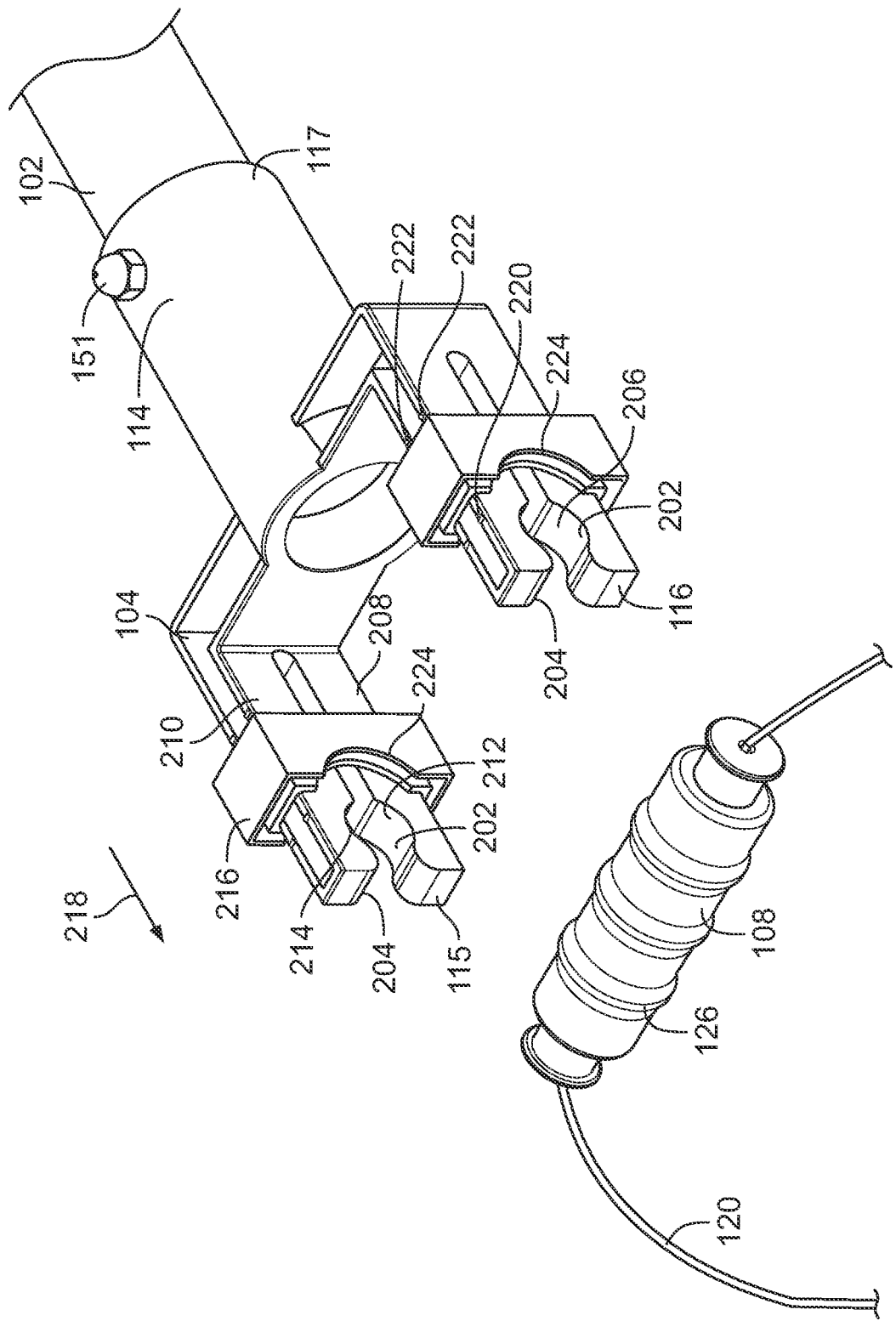
FIG. 3 is a detailed expanded isometric view of another example of a handle, another example of a yoke, and a portion of a barbell of the travel exercise equipment in accordance with a second disclosed example.

FIG. 3 is a detailed expanded isometric view of another example of the handle 108, another example of one of the yokes 104, and a portion of the barbell 102 in accordance with a second disclosed example. In contrast to the yoke 104 of FIGS. 1 and 2, each of the yoke arms 115, 116 of the yoke 104 of the example of FIG. 3 defines a slot 202 that has an opening 204 and an arm groove 206 arranged to receive the handle 108 of the container 106.

In the example shown, each yoke arm 115, 116 includes a first arm portion 208 and a second arm portion 210 and the arm groove 206 includes a first arm groove portion 212 and a second arm groove portion 214. The arm portions 208, 210 may be relatively flexible allowing for the handle 108 of the container 106 to be positioned within and removed from the slot 202.

The slot 202 is defined between the arm portions 208, 210 and the arm groove portions 212, 214 are formed by the corresponding arm portions 208, 210. Ends of the arm portions 208, 210 include tapered surfaces. The tapered surfaces may reduce the difficulty of having the handle 108 of the container 106 received within the slot 202 and between the arm groove portions 212, 214. The arm groove portions 212, 214 may be curved and have a cross-section that corresponds to a cross-section of the handle 108.

A band 216 surrounds each yoke arm 115, 116 and is arranged to slide along the corresponding yoke arm 115, 116 to change a width of the slot 202. For example, moving the band in a direction generally indicated by arrow 218 causes a width of the slot 202 to decrease and to allow for the handle 108 to be secured within the opposing arm groove portions 212, 214. Moving the band 216 in a direction generally opposite that indicated by arrow 218 allows a width of the slot 202 to increase and allows for the handle 108 to be positioned within or removed from the opposing arm groove portions 212, 214. A frictional interaction between the bands 216 and the yoke arms 115, 116 may secure the relative position of the bands 216.

The yoke arms 115, 116 may include forward stops 220 and rearward stops 222. The stops 220, 222 are adapted to be engaged by the bands 216 to restrict movement of the bands 216 in the forward direction (see, arrow 218) or the rearward direction (opposite the direction generally indicated by arrow 218).

In the example shown, the bands 216 include forward-facing cut outs 224. The cut-outs 224 may be adapted receive the central portion 126 of the handle 108 when the bands 216 are in the forward position.

While each yoke arm 115, 116 is shown having a corresponding band 216, other arrangements may prove suitable. For example, a single band may surround both yoke arms 115, 116 and be movable between a position allowing for the handle 108 to be released or positioned within the slot 202 and a closed position allowing for the handle 108 to be secured within the slot 202.

Figure 4:
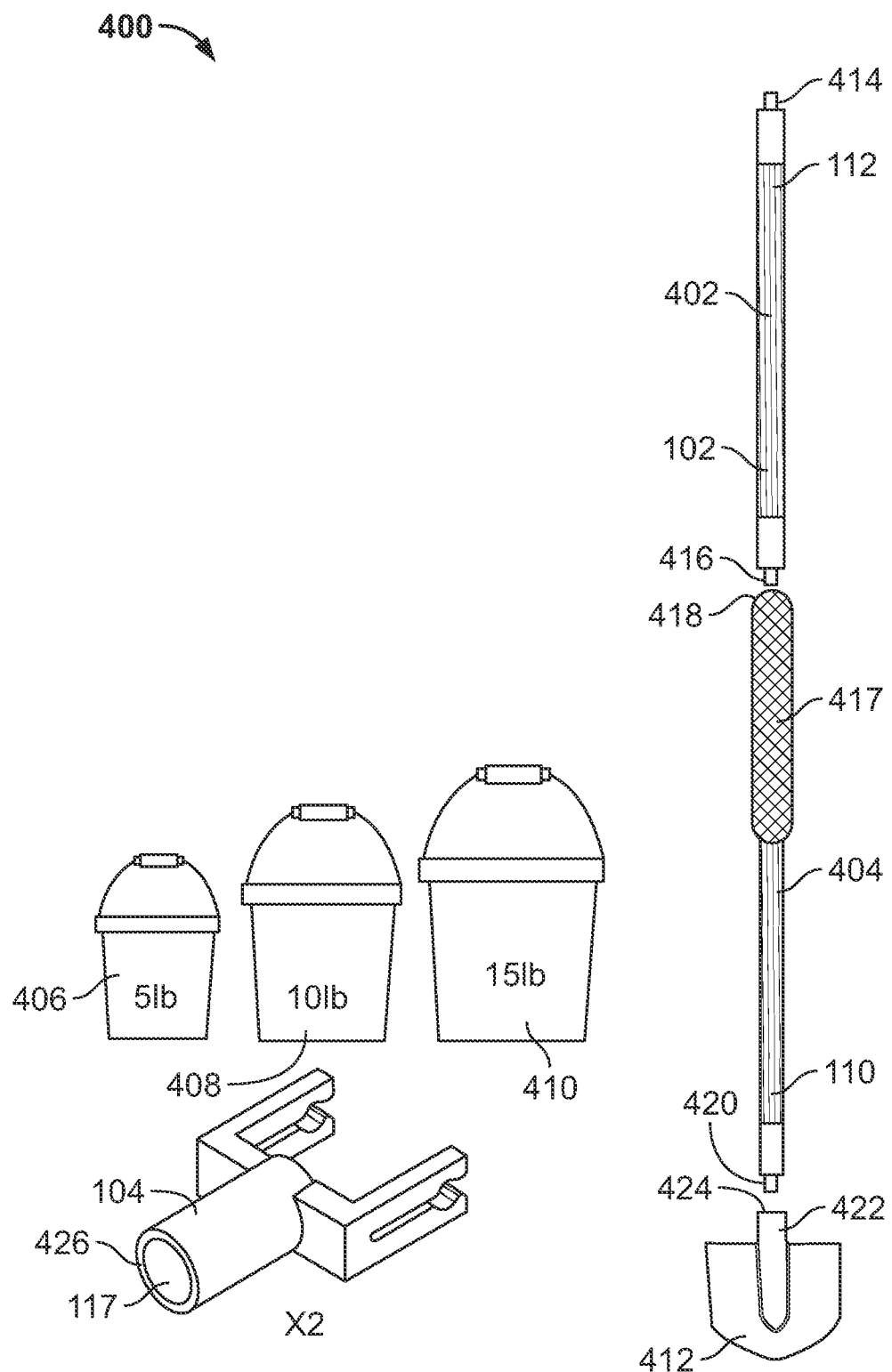
FIG. 4 illustrates a travel exercise equipment assembly in accordance with a third disclosed example including another example of the barbell including a first barbell portion and a second barbell portion, pairs of different size containers, a pair of yokes, and a shovel head.

FIG. 4 illustrates a travel exercise equipment assembly 400 in accordance with a third disclosed example including another example of the barbell 102 including a first barbell portion 402 and a second barbell portion 404, pairs of different size containers 406, 408, 410, a pair of the yokes 104, and a shovel head 412. The yoke 104 is similar to the yoke 104 shown in FIG. 3 but the yoke 104 of FIG. 4 does not show the bands 216 being included. While not shown, the bands 416 may be included on the yokes 104 of the assembly 400 of FIG. 4.

In the example shown, the first barbell portion 402 includes a pair of opposing male threads 414, 416. The second barbell portion 404 includes a grip 217 and female threads 418 and male threads 420. The grip 417 may alternatively be excluded and/or the first barbell portion 402 may additionally be provided with a grip. The male and female threads 416, 418 are adapted to form a threaded coupling to allow the first and second barbell portions 402, 404 to be coupled together. However, the first barbell portion 402 may be coupled to the second barbell portion 404 in different ways. For example, the first barbell portion 402 and the second barbell portion 404 may be telescopically coupled. Other types of couplings may prove suitable.

The shovel head 412 includes a socket 422 having female threads 424. The male and female threads 420, 424 are adapted to form a threaded coupling to allow the second barbell portion 404 and the shovel head 412 to be coupled together. The shovel head 412 may be used to fill the containers 406, 408, 410 with material. The material may be sand. Alternatively, the containers 406, 408, 410 may be filled with water. Other materials or substances may prove suitable to fill the containers 406, 408, 410 to achieve a desired weight.

The containers 406, 408, 410 are illustrated as being capable of containing five pounds of material, ten pounds of material, and fifteen pounds of material, respectively. In an example, the container 406 is a one gallon container, the container 408 is a two gallon container, and the container 410 is a three gallon container. However, the containers 406, 408, 410 may be sized to contain any amount of material. For example, the containers 406, 408, 410 may be sized to carry up to 8 pounds, up to 13 pounds, or up to 21 pounds. Moreover, less material may be put in the containers 406, 408, 410 to achieve a desired weight. The containers 406, 408, 410 may include fill lines/markers indicative of a particular weight. More or less containers 406, 408, 410 than shown may be provided with the travel exercise equipment assembly 400.

The yokes 104 of the assembly 400 may include female threads 426. The female threads 426 of the yokes 104 may be adapted to form a threaded coupling with the male threads 414, 420 of the barbell 102. Other approaches of coupling the yokes 104 and the barbell 102 may prove suitable. For example, the end portions 110, 112 of the barbell 102 may include one or more spring-latch assemblies having a spring-biased plunger. The plunger may be receivable within the fastener bore 118.

From the foregoing, it will be appreciated that the above disclosed apparatus, methods and articles of manufacture relate to travel exercise equipment assemblies for beach vacations. The travel exercise equipment can be easily packed without taking up significant luggage space allowing users to exercise while at the beach. Of course, the disclosed examples can be used in other locations other than the beach.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. Travel exercise equipment for use with containers having handles, comprising:
   a barbell including a first end portion and a second end portion; and
   a pair of yokes, each yoke includes a base and a pair of spaced-apart yoke arms extending from the base, the bases being adapted to be coupled to a corresponding end portion of the barbell, wherein each of the yoke arms defines a slot having an opening and a groove arranged to receive a handle of one of the container; and
   (1) wherein each arm includes a first arm portion and a second arm portion and the groove includes a first arm groove portion and a second arm groove portion, the slots being defined between the corresponding arm portions, the first arm groove portion being formed by the first arm portion and the second arm groove portion being formed by the second arm portion; or
   (2) wherein the equipment further comprises a band surrounding each arm and arranged to slide along the corresponding arm to change a width of the slot; or
   (3) both (1) and (2).

2. The travel exercise equipment of claim 1, wherein the arm grooves are upward facing arm grooves.

3. The travel exercise equipment of claim 1, wherein each arm has a track, further comprising a cover movable within the tracks between a covering position that covers the arm grooves and an uncovering position that uncovers the arm grooves.

4. The travel exercise equipment of claim 3, wherein each track includes a front opening and a side opening and wherein the cover includes first cover portions, second cover portions, and a cover handle, the first cover portions being movable through the corresponding front opening between the uncovering position and the covering position, each second cover portion extending through and being movable within a corresponding side opening, the cover handle being coupled to the second cover portions and adapted to move the cover between the covering position and the uncovering position.

5. The travel exercise equipment of claim 4, wherein each arm has a lock extending into the corresponding track and being adapted to retain the cover in either of the covering position and the uncovering position.

6. The travel exercise equipment of claim 5, wherein the lock comprises a flexible tab.

7. The travel exercise equipment of claim 1, wherein the spaced-apart yoke arms form a U-shape.

8. The travel exercise equipment of claim 1, wherein the base comprises a receptacle and a transverse fastener bore, the receptacle being adapted to receive the corresponding end portion of the barbell and the transverse fastener bore adapted to receive a fastener that couples the base and the corresponding end portion.

9. The travel exercise equipment of claim 1, wherein each band defines a forward facing cut-out that is adapted to receive a portion of the handle.

10. The travel exercise equipment of claim 1, wherein each arm includes a forward stop and a rearward stop between which the corresponding band is positioned.

11. The travel exercise equipment of claim 1, wherein the barbell includes a first barbell portion and a second barbell portion couplable to the first barbell portion.

12. The travel exercise equipment of claim 11, wherein the first barbell portion and the second barbell portion are couplable via a threaded connection.

* * * * *